(12) United States Patent  
Harding et al.

(10) Patent No.: US 6,306,300 B1  
(45) Date of Patent: Oct. 23, 2001

(54) FILTER CARTRIDGES AND FILTER CELLS

(76) Inventors: William Henry Harding, Carinya, Low Street, Carlton, North Yorkshire DN14 9PH; Steven Mark Green, 22 Main Street, Embsay, North Yorkshire BD23 6RE; Philip John Brown, 1 Lockfield Drive, Barnoldswick, Lancashire BB18 6HN; John Hallewell, The Gatehouse, Skipton Road, Earby, Lancashire BB18 6JL, all of (GB)

( * ) Notice: Subject to any disclaimer, the term of this patent is extended or adjusted under 35 U.S.C. 154(b) by 0 days.

(21) Appl. No.: 09/508,014

(22) PCT Filed: Aug. 28, 1998

(86) PCT No.: PCT/GB98/02592

§ 371 Date: May 9, 2000

§ 102(e) Date: May 9, 2000

(87) PCT Pub. No.: WO99/12631

PCT Pub. Date: Mar. 18, 1999

(30) Foreign Application Priority Data

Sep. 6, 1997 (GB) .................................................. 9718858

(51) Int. Cl.⁷ .................................................. B01D 29/41
(52) U.S. Cl. ........................... 210/346; 210/486; 210/492
(58) Field of Search ..................................... 210/330, 331, 210/346, 347, 486, 487, 488, 492

(56) References Cited

U.S. PATENT DOCUMENTS

| | | | |
|---|---|---|---|
| 2,444,147 | * | 6/1948 | Walton .................................. 210/169 |
| 4,704,207 | | 11/1987 | Chu . |
| 4,783,262 | * | 11/1988 | Ostreicher et al. ................... 210/314 |
| 5,055,192 | * | 10/1991 | Artinyan et al. ...................... 210/346 |

FOREIGN PATENT DOCUMENTS

| | | | |
|---|---|---|---|
| 1096331 | * | 1/1961 | (DE) ..................................... 210/486 |
| 2185196 | | 7/1987 | (GB) . |
| WO9104089 | | 4/1991 | (WO) . |

\* cited by examiner

*Primary Examiner*—Matthew O. Savage  
(74) *Attorney, Agent, or Firm*—Klauber & Jackson

(57) ABSTRACT

The invention provides a filter cell and a filter cartridge in which the filter cell includes an inner separator disc having a central aperture about which is located a plurality of upstanding pins or teeth, the pins or teeth being formed integrally with said separator disc. The filter cell includes layer(s) of filtration medium. The filter cartridge includes a plurality of filter cells arranged in contiguous and stacked relationship, adjacent filter cells being spaced from one another by spacer rings or gaskets, means being provided to hold the filter cells and spacer rings or gaskets in position to form said cartridge, the cartridge having an elongate central aperture into which filtered fluid may flow.

12 Claims, 2 Drawing Sheets

FILTER CARTRIDGES AND FILTER CELLS

This invention relates to filter cartridges of the type having a plurality of filter cells, and to the filter cells themselves.

Filter cartridges of the type with which the present invention is concerned, i.e. for the filtration of fluids such as wines, other alcoholic beverages such as beer, soft drinks, fruit juices, and other beverages, and for use in the chemical and pharmaceutical industries, comprise a plurality of individual filter cells which are connected together and which together form the cartridge, the cartridge being located in an outer vessel or container. Each of the individual cells is formed with upper and lower filtration medium layer(s) disposed about and in relation to an inner separator disc, and each has a central aperture which, when a plurality of cells are placed in contiguous and stacked relationship, form a continuous elongate central aperture down the centre of the cartridge. The elongate central aperture communicates with the interiors of the cells such that a fluid to be filtered—fed into the vessel or container—flows from the exterior of the individual cells, through the layer(s) of filtration medium of the cells, into the cells themselves, and thence into the elongate central aperture. The filtered fluid leaves the vessel or container through a suitable outlet in said vessel or container.

Such filter cartridges as described above may contain one or up to sixteen or even more individual filter cells in which, about the elongate central aperture, the filtration medium layer(s) of adjacent cells are in mutual contact. Because of this mutual contact, the height of the cartridge—which is desirably pre-set to an optimum height—has a tendency to reduce during use of the filtration apparatus, with the result that the individual cells become unstable, and compression must be applied to the cartridge in order to take up and compensate for the aforesaid reduction in height.

In addition, when the individual filter cells become unstable, they have a tendency to move laterally relative to each other, which may cause gaps to appear between adjacent cells, this resulting in the fluid to be filtered—or some at least of said fluid to be filtered—passing directly to the elongate central aperture instead of firstly passing through the filter cells.

The above described conditions-can result in failure of the filtration apparatus in that the fluid is not filtered sufficiently, and also in a shortened life expectancy of the individual cells. In addition due to the necessity of providing adjustment means in order to attempt to compensate for the above, the cost of the apparatus is increased.

There have been many proposals for improving the construction of and the performance of filter cartridges. For example, prior cases such as WO 91/04089, GB 2185196, and U.S. Pat. No. 4,704,207 disclose filter cartridges, but the disclosures in these prior cases retain the disadvantages referred to above and do not overcome the problems set forth herein.

The present invention therefore seeks to provide an improved form of filter cartridge which will obviate the disadvantages of known filter cartridges.

According to the present invention, there is provided a filter cartridge including a plurality of filter cells arranged in contiguous and stacked relationship, each filter cell including an inner separator disc having a central aperture and a plurality of upstanding members arranged about said aperture, adjacent filter cells being spaced from each other by spacer means, means being provided to hold said filter cells and said spacer means in position to form said cartridge, said plurality of upstanding members being in the form of pins or teeth and said spacer means being in the form of spacer rings or gaskets having lands or grooves which are engaged by the pins or teeth of adjacent cells.

Preferably, said rings or gaskets will be double-sided in that they are each provided with a land or groove at each side thereof.

Said spacer rings or gaskets will preferably be composed of plastics material and of the same material as the inner separator discs.

Preferably, said spacer rings or gaskets will be coated to make them chemically resistant.

The means to hold said filter cells and said spacer rings or gaskets in position will preferably be a plurality of straps which engage with end caps provided on said cartridge. Alternatively, said means will be thermal welding, adhesive, or a central core.

Said straps will preferably be composed of metal, alloy, or of plastics material.

Said end caps will preferably be annular and will each have three equispaced recesses in the upper surfaces thereof, said recesses being adapted to receive shaped ends of said straps so as to hold the integers of the filter cartridge in the desired positions.

In order that the invention may be more readily understood, an embodiment thereof will now be described, by way of example only, reference being made to the accompanying drawings, wherein.

Figure 1:
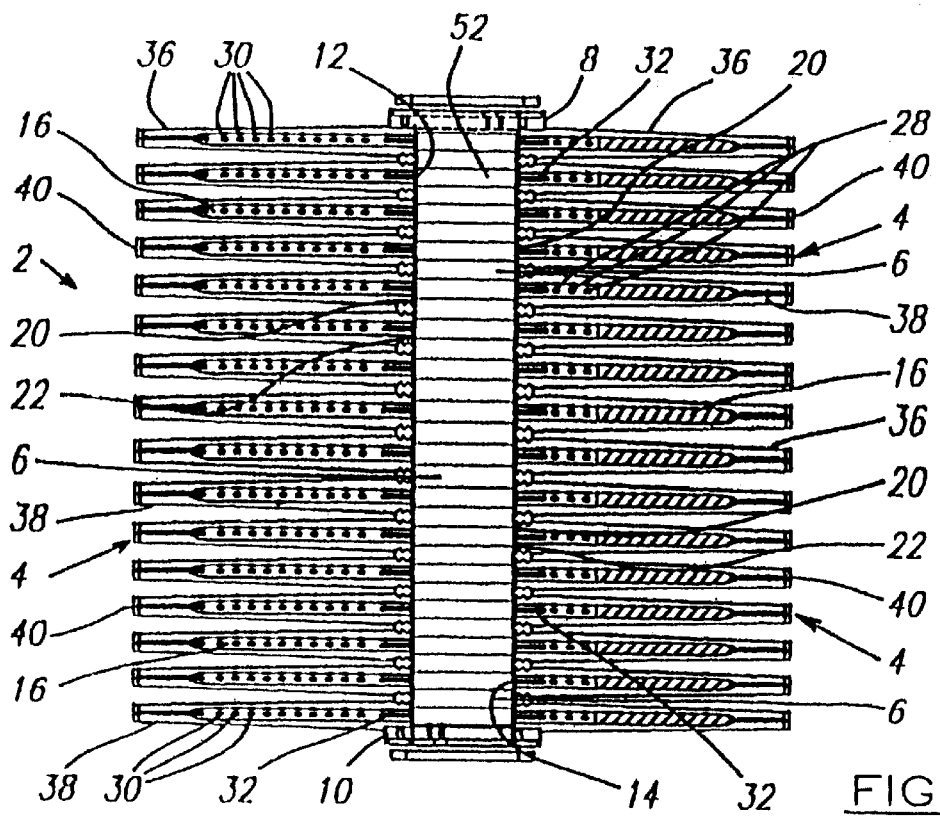
FIG. 1 is a front elevation of a filter cartridge in accordance with the invention.

Referring to the drawings, and firstly to FIG. 1, there is shown a filter cartridge, indicated generally by reference numeral 2, consisting of a plurality of individual lenticular filter cells 4, a plurality of spacer rings or gaskets 6, top and bottom end caps 8 and 10 respectively, and a plurality of metal straps to hold the various integers together and in the desired positions as shown in the drawing, two of such metal straps being indicated by reference numerals 12 and 14. The straps 12 and 14—and the other straps (not shown)—are preferably composed of stainless steel.

Figure 2:
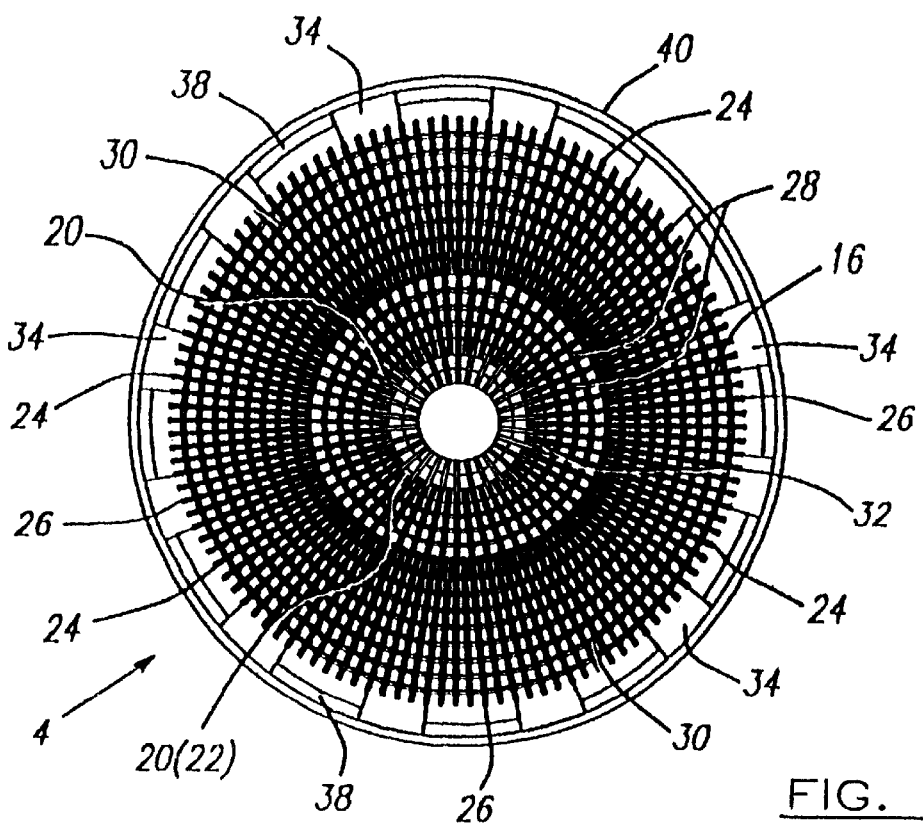
FIG. 2 is a plan view of one of the filter cells shown in FIG. 1, the upper layer(s) of filter material having been removed to show the inside of the cell.

Each of the lenticular filter cells 4, referring now to both FIGS. 1 and 2, comprises an inner separator disc 16 having a central aperture 18 about which is arranged a plurality of upper pins or teeth 20 and a lower plurality of pins or teeth 22, said pins or teeth 20 and 22 in fact being integral with each other. The pins or teeth 20 and 22 are located equidistant from the theoretical centre of the cell, and extend around the whole of the aperture 18. The separator disc 16 is provided with a first plurality of spaced radial ribs 24 and a second plurality of spaced radial ribs 26, the ribs 26 being shorter than the ribs 24 and being located between said ribs 24, the ribs extending in spoke-like fashion. As will best be seen from FIG. 2—in which in the interests of clarity only some of the pins or teeth have been shown—the pins or teeth 20 and 22 are formed integrally with the ribs 24, and the adjacent ribs are 'connected' by means of circumferential bands 28 and 30. In fact, the separator disc 16, including the pins or teeth 20 and 22, the ribs 24 and 26, and the circumferential bands 28 and 30, as well as a central strengthening portion 32, is formed as a single-piece structure by a moulding process in a plastics material.

The outer periphery of the separator disc 16 is formed with outwardly projecting lugs 34 which are spaced apart as seen in FIG. 2 and which, together with layer(s) of filtration medium 36 and 38 located above and below the separator disc 16, are held by a peripheral ring 40 so as to form the cell. With the peripheral ring 40 in position, the layer(s) 36 and 38 of filtration medium are held in close mutual relationship at their peripheries. Each of the layers of filtration medium has a central aperture.

Figure 3:
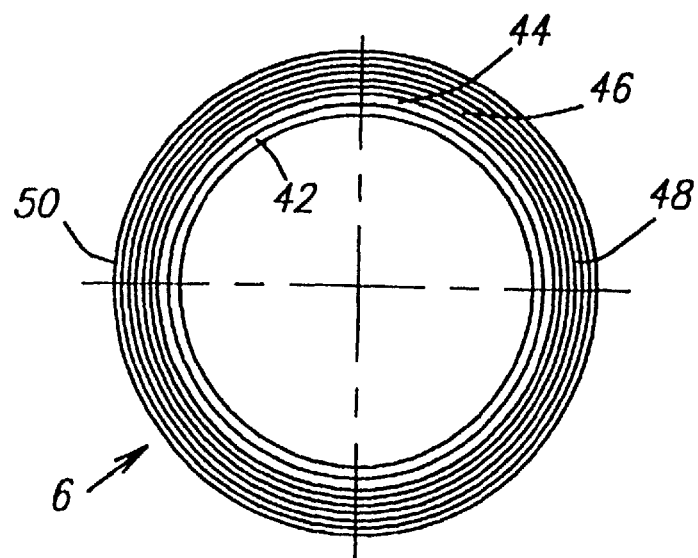
FIGS. 3 and 4 are respectively a plan view and an elevation of a spacer ring or gasket forming part of the cartridge of FIG. 1.
Figure 4:
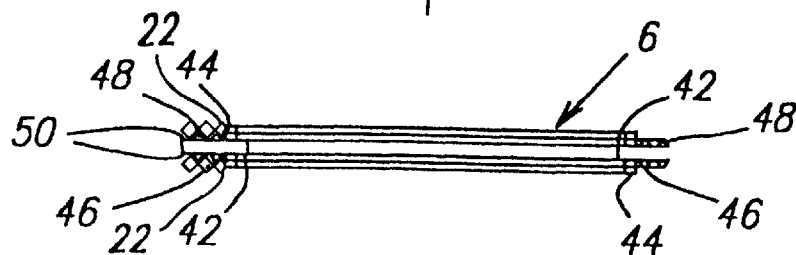

One of the spacer rings or gaskets 6 is shown in greater detail in FIGS. 3 and 4. As will be seen, the spacer ring or gasket 6 is annular and has at each side, starting from the centre of the ring or gasket, a land or groove 42, a wall 44, spaced protruberances 46 and 48, and a peripheral land 50. A central aperture in the spacer ring or gasket 6 is of the same diameter as the central aperture in the separator disc 16, such that when the cartridge is assembled as shown in FIG. 1, the central apertures in the separator discs and the spacer rings or gaskets are co-axial so as to form an elongate aperture 52 in the cartridge.

As shown in FIG. 4, the spacer means includes spacer rings 6 each having a circumferential land 42. The radially outer periphery of each land 42 is bounded by a circumferential wall 44. Each land 42 is engaged by the pins or teeth 20, 22 of adjacent filter cell. The pins or teeth 20, 22 are arranged in an interlocking position with the respective circumferential wall to prevent movement of any of the filter cells in a radial direction of the central aperture of the spacer rings 6.

Figure 5:
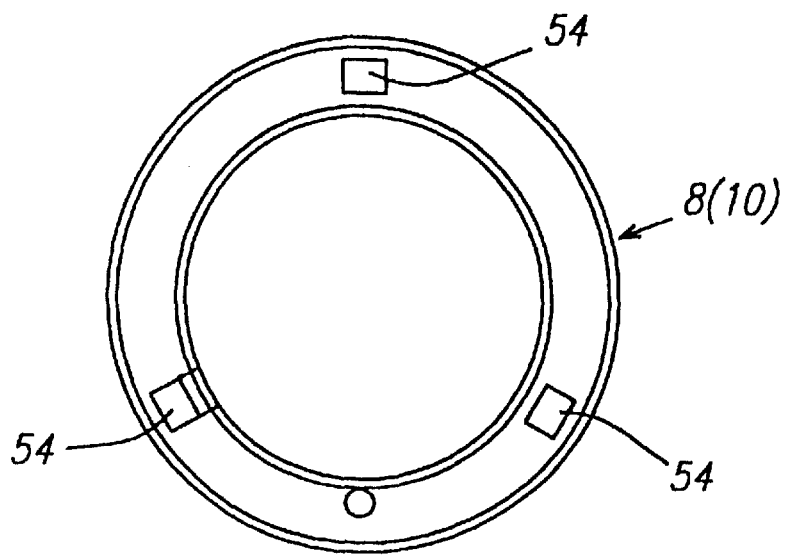
FIGS. 5 and 6 are respectively a plan view and an elevation of an end cap forming part of the cartridge of FIG. 1.
Figure 6:
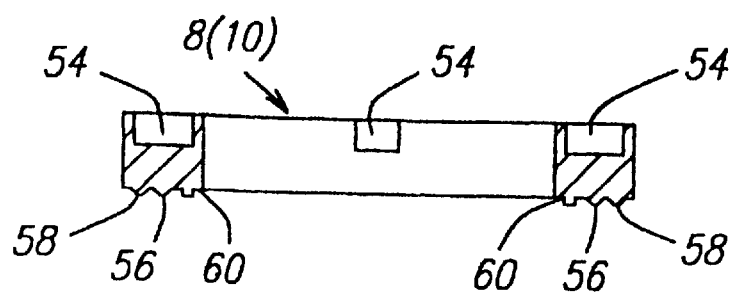

The end caps 8 and 10 are identical one to the other, and one of said end caps is shown in greater detail in FIGS. 5 and 6. The end cap is annular as seen and its upper surface has three equispaced recesses 54 therein which are adapted to receive the shaped ends of the metal straps previously referred to in connection with FIG. 1. The underside of the end cap is provided with protruberances 56 and 58, and a land 60, these being in the same positions as the corresponding protruberances and lands on the spacer rings or gaskets 6.

The spacer rings or gaskets 6 and the end caps 8 and 10 are formed of the same material as the separator disc 16, i.e. plastics material.

When the cartridge is assembled as shown in FIG. 1, the protruberances 46 and 48 on the spacer rings or gaskets 6 and the protruberances 56 and 58 on the end caps 8 and 10 engage the layer(s) 36 and 38 of filtration medium so as to seal the lenticular cells with respect to their relative spacer ring or gasket or end cap.

To maintain the various integers of the cartridge in the positions shown, the previously mentioned straps are applied in position. Because there is no 'give' in the assembly, it is not possible to compress the cells 4 and spacer rings or gaskets 6 in order to apply the straps—as is the conventional practice. Therefore, the straps are initially formed with only one pre-formed end, the other end being straight and tempered. To apply the straps, the straps are inserted in the central aperture 52 and the pre-formed ends of the straps are placed in the recesses in the lower end cap 10. In this position, the upper ends of the straps protrude from the central aperture, and to fully apply the straps, the upper ends thereof are formed by dies into the shape shown and simultaneously placed in the recesses in the upper end cap 8 so as to fully lock the various integers of the cartridge together.

Instead of the straps being of metal, more preferably of stainless steel, the straps may be composed of an alloy such as that sold under the trade mark HASTELLOY which gives enhanced resistance to both oxidising environments and strongly reducing acids, and which is corrosion resistant. Such material is particularly useful in the formation of the straps where the filter cells and filter cartridges are to be used in the pharmaceutical and chemical industries.

Also, instead of the straps being of stainless steel or alloy, they may be composed of plastics material, in which case the straps may have one or both ends pre-formed. Alternatively, the straps may have their ends formed in situ when assembling the cartridge.

Because the individual lenticular filter cells 6 are sealed with respect to their respective spacer rings or gaskets, and similarly with respect to the end caps 8 and 10, then when a fluid to be filtered is fed into a vessel or container (not shown) in which the cartridge is located, the fluid will pass through the layer(s) of filtration medium into the interior of the cells 4 and thence through the spaces between the pins or teeth 20 and 22 and into the central aperture 52.

Due to the fact that the pins or teeth 20 and 22 on the separator discs 16 and the spacer rings or gaskets are in mutual contact, as well as the end caps 8 and 10 being in mutual contact with the pins or teeth on the upper and lower separator discs, there being no contact between the layer(s) 36 and 38 of filtration medium of adjacent cells, and because the separator discs, spacer rings or gaskets, and the end caps are composed of the same material—which is generally non-compressible then there will be no collapsing and deterioration of the cartridge in use. As a result of this, then there will be no lateral movement of the cells relative to one another due to the interlocking between the pins or teeth and the spacer rings or gaskets, and hence there will be no gaps created through which unfiltered fluid could pass.

Thus the invention provides a filter cartridge and a filter cell for incorporation into a filter cartridge which overcomes the disadvantages of known cartridges and cells.

It will be appreciated that instead of the individual filter cells and spacer rings or gaskets and end caps being held in position by the afore-mentioned straps, they may be held in position by thermal welding applied to the interior of the elongate central aperture of the cartridge, or they may be held in position by means of the use of adhesive.

Where appropriate, and to suit a particular working environment, such as in the pharmaceutical and chemical industries, the spacer rings or gaskets may be coated with the material VITON sprayed over with PTFE, or they may be coated with TEFLON.

Finally, in addition to the pins or teeth on the separator disc of the lenticular filter cell, pins or teeth may be provided on the spacer rings or gaskets, or some at least of said spacer rings or gaskets, such that the sets of pins or teeth interengage.

What is claimed is:

1. A filter cartridge including a plurality of filter cells, arranged in a contiguous and stacked relationship,
   each filter cell including an inner separator disc having a central aperture surrounding a central axis and a plurality of upstanding members extending axially outwardly from opposite sides of each said disc and being arranged about said central aperture,
   filter medium for covering opposite sides of each said disc,
   spacer means for spacing adjacent filter cells from each other,
   means for holding said plurality of filter cells in position to form said cartridge, wherein, said plurality of upstanding members comprising pins or teeth, said spacer means comprising spacer rings surrounding said central axis, each said spacer ring having a circumferential land, wherein a radially outer periphery of each said land is bounded by a circumferential wall, each said land being engaged by the pins or teeth of adjacent filter cells, wherein said pins and teeth are arranged in an interlocking position with the respective said circumferential wall to prevent movement of any of said filter cells in a radial direction of said central aperture.

2. A filter cartridge according to claim 1, wherein said spacer rings are double-sided and each side is provided with a said circumferential land and a said circumferential wall.

3. A filter cartridge according to claim 1, wherein said spacer rings are composed of a plastic material and is the same material as each inner separator disc of said plurality of filter cells.

4. A filter cartridge according to claim 1, wherein said spacer rings are coated to make them chemically resistant.

5. A filter cartridge according to claim 1, wherein said means for holding said filter cells and said spacer rings in position comprises a plurality of straps which engage with end caps provided on said cartridge.

6. A filter cartridge according to claim 5, wherein said straps are composed of metal, or of a plastic material.

7. A filter cartridge according to claim 5, wherein said end caps are annular and each end cap has an upper surface having three equispaced recesses which are adapted to receive shaped ends of said straps so as to hold integers of the filter cartridge in the desired positions.

8. A filter cartridge accord to claim 1, wherein said continuous and stacked relationship of the filter cells forms an elongate central aperture in said cartridge.

9. A filter cartridge according to claim 1, wherein said pins or teeth are arranged about the whole of said central aperture.

10. A filter cartridge according to claim 9, wherein said pins or teeth are formed integrally with the separator disc.

11. A filter cartridge according to claim 1, wherein said separator disc incorporates a first plurality of radially extending ribs and a second plurality of radially extending ribs, said second plurality of radially extending ribs having a shorter length than the ribs of said first plurality, the pins or teeth being integral with and forming part of the ribs of said first plurality of ribs.

12. A filter cartridge according to claim 1, wherein said filter medium comprises sheets or layers of filtration medium being held in close relationship at their radially outer peripheries by a peripheral ring.

* * * * *